# United States Patent [19]
Reischl et al.

[11] 3,714,095
[45] Jan. 30, 1973

[54] COARSELY DISPERSED, SEDIMENTING AQUEOUS POLYURETHANE DISPERSIONS

[75] Inventors: Artur Reischl; Dieter Dieterich, both of Leverkusen, Germany

[73] Assignee: Farbenfabriken Bayer Aktiengesellschaft, Leverkusen, Germany

[22] Filed: Jan. 12, 1971

[21] Appl. No.: 105,982

Related U.S. Application Data

[63] Continuation-in-part of Ser. No. 671,197, Sept. 28, 1967, abandoned.

[30] Foreign Application Priority Data

Oct. 1, 1966 Germany..............................F 50 344

[52] U.S. Cl....260/29.2 TN, 260/75 NP, 260/77.5 Q, 260/77.5 AM, 260/858
[51] Int. Cl........C08g 41/04, C08g 51/24, C08j 1/48
[58] Field of Search.......................260/29.2 TN, 858

[56] References Cited

UNITED STATES PATENTS

| | | | |
|---|---|---|---|
| 2,968,575 | 1/1961 | Mallonee | 260/29.2 TN |
| 3,178,310 | 4/1965 | Berger | 260/29.2 TN |
| 3,294,724 | 12/1966 | Axelrood | 260/29.2 TN |
| 3,294,752 | 12/1966 | Wilkinson | 260/77.5 |
| 3,377,308 | 4/1968 | Oertel et al. | 260/858 |
| 3,384,606 | 5/1968 | Dieterich et al. | 260/29.2 TN |
| 3,384,681 | 5/1968 | Kobayashi et al. | 260/858 |
| 3,388,087 | 6/1968 | Dieterich et al. | 260/77.5 |
| 3,437,624 | 4/1969 | Dawn et al. | 260/29.2 TN |

*Primary Examiner*—Donald J. Arnold
*Assistant Examiner*—Arthur H. Koeckert
*Attorney*—Robert A. Gerlach

[57] ABSTRACT

Coarse, aqueous dispersions of polyurethanes that sediment but are capable of being redispersed are prepared from 40 to 99.5 percent by weight of a polyurethane polymer having a molecular weight greater than 5,000 and preferably above 20,000 which is free of salt-forming groups and from about 0.5 to about 60 percent by weight of a polyurethane polymer containing salt-forming groups. Salt formation is permitted to occur until 0,0007 to 0,011 equivalent percent has taken place and the mixture is then dispersed at least in a quantity of water such that the solids content is 60 percent.

2 Claims, No Drawings

COARSELY DISPERSED, SEDIMENTING AQUEOUS POLYURETHANE DISPERSIONS

This is a continuation-in-part of copending application Ser. No. 671,197 filed Sept. 28, 1967 now abandoned, and relates to the preparation of aqueous polyurethane dispersions and particularly to coarse dispersions that settle out but, which are capable of being redispersed.

The preparation of aqueous polyurethane dispersions is already known. To obtain stable dispersions, one either incorporates groups having a salt-type character into the polyurethane or uses those emulsifiers conventionally used for polymer dispersions, e.g., polyalkylene glycol ethers, long chained alcohols, alkyl(aryl)-sulphonic acids, soaps or quaternary ammonium salts. If coagulation of such polyurethane dispersions takes place, irreversible precipitation occurs.

It is therefore an object of this invention to provide improved aqueous polyurethane dispersions. It is another object of this invention to provide coarse dispersions that settle out but are redispersible.

The foregoing objects and others which will become apparent from the following description are accomplished in accordance with the invention generally speaking by providing coarsely dispersed sedimenting but redispersible aqueous polyurethane dispersions from (a) about 40 to about 99.5 percent by weight of high molecular weight polyisocyanate polyaddition products which are free of groups forming salts under the reaction conditions and which have been obtained from compounds of a molecular weight of 500 to 20,000 containing hydroxyl and/or amino groups and organic polyisocyanates and, if desired, chain lengthening agents having reactive hydrogen atoms and a molecular weight below 500; and (b) about 0.5 to about 60 percent by weight of high molecular weight salt-type polyisocyanate polyaddition compounds or polyisocyanate polyaddition compounds capable of salt formation, if desired in solution; and, after salt formation has taken place to the extent of 0,0007 to 0,011 equivalent percent, based on the sum of solid substance (a) and (b), the mixture is combined with at least a quantity of water such that the resulting dispersion has a solids content of 60 percent. The term equivalent percent indicates the number of equivalents per 100 grams.

It is surprising that the polyurethanes or polyurethane ureas mentioned under (a) can be converted by means of the particular polyurethanes or polyurethane ureas capable of salt formation specified under (b) into redispersible aqueous polyurethane dispersions which have properties that make them suitable for a diversity of uses. Special mention may be made in this connection of the fact that powders of rubbery elastic polyurethanes which are suitable, for example, as adhesives can also be prepared via such dispersions.

The preparation of the polyisocyanate polyaddition produce (a) which should have a molecular weight as far as possible above 5,000 and preferably above 20,000 is carried out in known manner in the melt or in solution. It is preferred to use products of the type which will either dissolve in an organic solvent that has a boiling point below 100° C. and is at least partially miscible with water or will form in such a solvent a disperse organic (-aqueous) system which can be worked up like a true solution.

For the preparation of the polyisocyanate adducts (a), aliphatic, aromatic or araliphatic polyisocyanates may be used, such as, for example, hexamethylene-1,6-diisocyante, butylene-1,4-diisocyanate, cyclohexylene-diisocyanate, 2,4- and 2,6-toluylene diisocyanate, dimeric 2,4-toluylene diisocyanate, diphenylmethane-4,4'-diisocyanate, naphthylene-1,5-diisocyanate, 4,4'-diisocyanatodiphenyl-propane-(2,2) and xylylene diisocyanate. Polyisocyanates of higher valency, such as triphenylmethane-4,4',4''-triisocyanate, the reaction product of trimethylolpropane and 3 mols of diisocyanate biuret triisocyanates may be added in minor amount. Also to be mentioned are tris(4-isocyanatophenyl)-thiophosphoric acid ester and crude commercial polyisocyanate mixtures, e.g., of toluylene diisocyanate, and especially the phosgenation product of crude condensates of aniline and formaldehyde, and trimerized toluylene diisocyanate.

Any suitable hydroxyl and/or amino group-containing compound of molecular weight of about 500 to about 20,000 and preferably of about 1,000 to about 3,000 may be used for the preparation of the isocyanate polyaddition compounds (a) such as, for example, polyesters or mixed polyesters, polycarbonates, polyester amides, polyhydric polyethers, poly(thio)ethers or polyacetals which may already contain urethane, N-alkyl or N-allyl urethane groups, and as additional components there may be used high molecular weight hydroxyl-functional or aminofunctional organo-siloxanes.

Any suitable hydroxyl polyester may be used for the preparation of the isocyanate modified active hydrogen compound, such as those prepared from dihydric alcohols and dicarboxylic acids. Any suitable dicarboxylic acid may be used such as, adipic acid, methyl adipic acid, glutaric acid, succinic acid, azelaic acid, sebacic acid, nonane-dicarboxylic acid, thiodipropionic acid, pimelic acid, ricinoelic acid, suberic acid, fumaric acid, maleic acid, phthalic acid, terephthalic acid, isophthalic acid, hexahydroterephthalic acid and the like. Any suitable dihydric alcohol may be used such as, for example, ethylene glycol, 1,3-propylene diol, dimethyl propane-1,3-diol, 1,4-butanediol, 1,6-hexanediol, 2,5-hexanediol, methyl-hexanediol, 1,10-decanediol, diethylene glycol, triethylene glycol, 4,4'-dihydroxy dicyclohexyl dimethyl methane, bis-oxymethyl cyclohexane, phenylene-1,4-bis-hydroxyethyl ether, trimethylol propane and the like. Further suitable polyesters can be obtained from caprolactones and glycols such as 1,4-butanediol. Since the polyester must be substantially linear, trifunctional alcohols can be employed in its preparation to a minor extent only, that is up to at most 5 mol percent based on the amount of alcohol starting materials.

Any suitable polyester amide may be used such as those prepared by the incorporation of amino alcohols, amino carboxylic acids and polyamines into the formulations for hydroxyl polyesters set forth above. Any suitable amino alcohols such as, for example, ethanol amine, propanol amine and the like may be used. Any suitable polyamine such as, for example, toluylene diamine, hexanediamine, piperazine, and the like may be used. Any suitable amino carboxylic acid such as, for example ω-amino caprioc acid and ω-amino undecanoic acid and the like may be used. Specific polyester amides include for example, adipic acid, diethanolamide acid, terephthalic acid, bis-N-methyl-propanol amide and the like.

Any suitable polyalkylene ether may be used in the preparation of isocyanate modified active hydrogen containing compounds in accordance with this invention such as the reaction product of any of the above-mentioned polyhydric alcohols with alkylene oxides such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. The polyhydric polyalkylene ethers may be prepared by any known process such as, for example, the process disclosed by Wurtz in 1859 and in "Encyclopedia of Chemical Technology," Vol. 7, pp. 257–262, published by Interscience Publishers, Inc. (1951) or in U.S. Pat. No. 1,922,459.

Any suitable polyhydric polythioether may be used such as, for example, the condensation product of a thiodiglycol or the reaction product of a polyhydric alcohol such as is disclosed above for the preparation of the hydroxyl polyesters with any other suitable thioether glycol. Other suitable polyhydric polythioethers are disclosed in U.S. Pat. Nos. 2,862,972 and 2,900,368.

Any suitable polyacetal may be used such as, for example, the reaction product prepared by reacting an aldehyde with a polyhydric alcohol. Any of the polyhydric alcohols mentioned above may be used. Any suitable aldehyde may be used such as, for example, formaldehyde, polymers of formaldehyde, acetaldehyde, butyraldehyde and the like. The polyacetals may further be prepared by reacting long chain polyhydric alcohols such as polyesters and polyalkylene ethers such as those mentioned above with aldehydes. Such long chain alcohols may have a molecular weight of from about 200 to about 2,000. The polyacetals described in German Pat. specification Nos. 1,039,744 and 1,045,095 are suitable for use in the preparation of the isocyanate-modified polyhydroxy compound in accordance with this invention. Any of these compounds containing active hydrogen containing groups when reacted with an excess of an organic polyisocyanate are suitable in the practice of this invention to prepare isocyanate modified polyhydroxy compounds.

Any suitable hydroxyl-terminated polycarbonate such as, for example, those set forth in Canadian Pat. Nos. 578,585, 578,795 and 594,805 may be used. Further, the polycarbonates obtained from cyclic carbonates and glycols and those hydrocarbon polymers which contain small quantities of hydroxyl groups can likewise be used as starting materials.

Any suitable compounds having a molecular weight of 500 to 20,000 and having terminal amino resp. alkylamino groups may be used. Such compounds in question are, for example, those set forth in French Pat. No. 1,377,429 or German Pat. No. 1,176,357 or published Netherland Pat. application No. 6,615,459.

Any suitable chain lengthening agent of molecular weight up to 500 for the preparation of polyaddition product (a) include, for example, ethylene- or polyethylene glycols, butanediol, 1,6-hexamethylene glycol, allylmonoglycerol ether, 3,3'-dichloro-4,4'-diamino-diphenylmethane, 4,4'-bis-(N-methylamino)-diphenylmethane, hydrazine, carbodihydrazide, ethanolamine, water, and the like. A certain proportion of chain lengthening agents having a valency higher than two may be used in conjunction with these if desired.

The best properties are found in the polyisocyanate polyaddition products of highest molecular weight. In order to be able to dissolve such high molecular weight polyurethanes in low boiling solvents, both the type and quantity of reactants and the reaction conditions must be carefully adjusted to each other.

In a preferred method of preparing the polyaddition product (a) used as starting material for the process according to the invention, the proportion of NCO to OH or $NH_2$ (NRH) is made equal to about one or more if the reactants are exclusively bifunctional. If trivalent and higher valent reactants are used at the same time, the ratio of NCO to OH or $NH_2$ (NRH) may also be below this. The polyaddition reactions are preferably carried out in bulk and the adducts may continue to be heated until the NCO content is below 3 percent by weight or better still below 0.3 percent by weight. In order that the high molecular weight reaction products may be dissolved in the preferred low boiling solvents, the isocyanate equivalent should be less than 0.60 equivalent percent, based on polyaddition product (a). The polyisocyanate is preferably used in the quantity of 0.15 to 0.35 equivalents percent for every 100 parts of polyaddition product.

Chain lengthening with glycols, which may also contain ether, ester, acetate, carbonamide, urethane or N-alkyl urethane groups, is frequently preferred to chain lengthening with amine or water.

According to another method of preparing the polyaddition product (a) used as starting material for the process according to the invention, the polyaddition is carried out in an organic solvent such as methylene chloride, acetone, tetrahydrofuran or dimethylformamide; in this procedure, the ratio of NCO to OH may lie between 0.9 and 1.5. In this procedure, one may also use amines, carboxylic acids or water as chain lengthening agent without the risk of premature cross-linking.

Low molecular weight polyisocyanates such as monomeric, dimeric, trimeric or tetrameric toluylene diisocyanate or the products of addition thereof to polyfunctional alcohols may be added to the high molecular weight polyurethane composition (a) before dispersion in an amount of 1 to 30 percent, and this mixture may then be stirred until increase in viscosity sets in and is then dispersed.

If reactants having secondary hydroxyl groups are used, such as poly — (oxypropylene)glycols, it has been found advantageous for the preparation of polyaddition product (a) to employ a multistage process in which at first about 2 mols of diisocyanate are allowed to react at elevated temperature (120° to 180°C.) until all the secondary hydroxyl groups have been used up. More diisocyanate may then be added, if desired, and a chain lengthening reaction carried out.

The salt type polyisocyanate polyaddition compounds (b) or polyaddition compounds capable of salt formation are generally prepared from the same reactants as described for the preparation of polyaddition products (a), but in addition they contain in known manner, as their characteristic feature, salt-type groups or groups capable of salt formation which can be converted at least partly, up to a total of 0,0007 to 0,011 equivalent percent of the total quantity of polyurethane(urea) into cationic polyurethanes having, for example, the following groups:

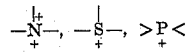

In order to prepare such polyurethanes there are used for the synthesis, in addition to or instead of the usual polyisocyanates and higher or low molecular weight compounds having reactive hydrogen atoms, compounds of the type which contain, in addition to reactive hydrogen atoms or isocyanate groups, salt-type groups or groups capable of salt formation, i.e., groups which are converted into salt-type groups by neutralization or alkylation. The compound which contains the salt-type group or group capable of salt formation may, as known per se, be a higher molecular weight polyhydroxy compound, as isocyanate or a chain lengthening agent and it may also be a monofunctional chain breaking agent. A number of characteristic examples taken from the large number of suitable compounds available is given below: Polyether-polythioether diols, polythioether diol-polymethosulphates, polyhydroxypropylated hexahydroaniline, copolymers of propylene oxide and epichlorohydrin, N-methyldiethanolamine, thiodiglycol, N,N-bis-hydroxyethyl-N'-chloroethyl-urea, bromopropanol, dimethylaminoethanol and chloromethylphenyldiisocyanate.

The coarsely disperse, redispersible polyurethane (urea) dispersions which are prepared according to the invention may be obtained, for example, by dissolving or dispersing the polyisocyanate polyaddition product (a) in a solvent such as acetone or methyl ethyl ketone, ethyl acetate, methylene chloride, chloroform or tetrahydrofuran, adding the polyurethane (b) in the form of a solid or solution before salt formation, effecting salt formation by the addition of suitable acids, with stirring, and lastly adding the desired quantity of water to the organic solution. The organic solvent is removed, by distillation, if desired under reduced pressure or if the phases separate, by separation. Both the size and form of the particles of resulting aqueous polyurethane dispersion can be influenced by the way in which the reaction mixture is mechanically agitated.

Alternatively, one may proceed for example, by combining the polyaddition product (a) in solution with polyurethane (b) which is already present in the salt form, and diluting the mixture with water and distilling off or separating the solvent.

One may also first place the aqueous phase into the reaction vessel and then add the solution or the hot melt of the already combined polyurethane masses (a) and (b). Where this method is employed, special care must be taken to insure sufficiently fine subdivision of the organic phase. This is achieved, for example, by the use of high speed stirrers or ultrasonics or by injecting the organic phase through nozzles. Other methods of carrying out the process according to the invention consist in adding the aqueous solution of component (b) to component (a) in the reaction vessel and mixing with water in the manner described above. Alternatively, component (b) may first be dissolved in the aqueous phase and then combined with component (a).

If additional cross-linking of polyurethanes (a) and (b) used as starting material is desired, this can be achieved by incorporating suitable functional groups which effect cross-linking into polyurethanes (a) and/or (b) or subsequently adding these functional groups to the mixture of (a) and (b). It has been found especially advantageous to carry out cross-linking with formaldehyde or compounds which split off formaldehyde.

The compounds (b) of cationic character are preferably used in nonionic form, i.e., as amines, sulphides or phosphorus compounds. Salt formation using acids or quaternizing may then follow. Quaternizing reactions may also proceed simultaneously with the isocyanate polyaddition. The preparation of polyurethanes (b) of a containing salt-type groups or groups capable of salt formation has been described in, for example, German Auslegeschriften Nos. 1,178,586, 1,184,946 and 1,179,363 and in Belgian Pat. specifications Nos. 653,223, 658,026 and 669,954. Those polyurethanes which are mentioned in the Belgian Pat. specification No. 636,799 in which the quaternary ammonium groups are formed during the chain forming reaction are also suitable.

The polyurethane component (b) is preferably synthesized in such a way that it has the structure of a block polymer, i.e., the salt groups are not uniformly distributed in the macromolecule but concentrated in hydrophilic blocks. This block structure can be achieved by, for example, synthesizing the polyurethane (b) from nonionic, apolar, higher molecular weight polyhydroxy compounds and low molecular weight isocyanates that are of a salt type or capable of salt formation, and/or chain lengthening agents.

Salt-type polyurethanes (b) of special interest are those which contain, in addition, groups capable of being cross-linked, for example, free or masked isocyanate groups, reactive halogen atoms, methylother groups, aziridine rings or reactive double bonds. These enable reactions to take place on the surface of the particles of the dispersion.

Conversion of the groups capable of salt formation into salt groups may be effected for example by using:

1. Alkylating agents capable of converting tertiary nitrogen atoms, tertiary sulphide sulphur atoms or tertiary basic phosphorus atoms into the onium form, e.g., methyl chloride, dimethyl sulphate, methyl chloromethyl ether, bromoethanol or a p-toluenesulphonic acid ester.

2. Tertiary amines, phosphines or thioethers which are converted into onium compounds by reactive chloroalkyl or bromoalkyl groups contained in component (b).

3. Acids which form quaternary ammonium salts with amines, such as hydrochloric acid, phosphoric acid, fluoboric acid, fluosilicic acid, acetic acid, acrylic acid, lactic acid, amidosulphonic acid, benzoic acid or citric acid.

The reaction with compounds mentioned under one and two is carried out in organic solution or in the melt whereas the acids are preferably used in aqueous solution and may be added either to the organic or to the aqueous phase. In the last mentioned case, salt formation and dispersion take place simultaneously.

An additional cross-linking of the dispersed particles can also be achieved by the addition of polyfunctional cross-linking agents such as formaldehyde derivatives, polyisocyanates or peroxides to the aqueous dispersion. Highly cross-linked elastomer particles can be obtained in this way.

The aqueous dispersions obtained can be used in many different ways. Thus by simply removing the aqueous solvent, e.g., by decanting it off or removing it by suction, and subsequent drying, very fine powders can be produced which can be used, e.g., as additives to polymers such as polyvinyl chloride, polyvinyl acetate or copolymers of styrene and butadiene. The powder can be added to the solid or molten polymers, e.g., on mixing rollers or in extruders. On the other hand, the powder may, for example, be stirred into polymer dispersions. The overall properties of polymers can be substantially improved by the addition of such polyurethane powders.

Polyurethane powders can also be used as high grade fillers for epoxide and polyester resins resulting in an improvement in flexibility and elasticity. They are also suitable for use as solvent resistant binders for fiber fleeces in which the fibers may be of natural (cotton or wool) or synthetic origin (rayon, polyamide, polyacrylonitrile or polyester). Inorganic fibers (glass or asbestos) can also be bound with such binders.

Other applications include the use of these powders as adhesives, as admixtures to paints and lacquers for improving the abrasion resistance, and as additives for lubricants.

The invention is further illustrated but not limited by the following examples in which parts are by weight unless otherwise specified.

Preparation of Isocyanate Polyaddition Products (a) as Starting Material for the process According to the Invention. (For Recipes see Table 1)

Method I (Prepolymer Process)

In an apparatus equipped with stirrer, the given quantity of polyisocyanate is added at 80° to 130°C. to the dehydrated polyester or polyether containing hydroxyl groups and the mixture is stirred for about 10 minutes (30 to 60 minutes in the case of a polyether containing secondary hydroxyl groups). The chain lengthening agent is then allowed to react at suitable temperatures, according to the activity, so that as far as possible, the final temperature does not exceed 200°C. A temperature range of 120° to 170° will in most cases be employed. If desired, the reaction mixture is subsequently heated for 1 to 10 hours at 80° to 110°C. to complete the reaction.

When cooled to room temperature, the reaction product is granulated and made up into a solution. A heterogeneous organic system comprising colloid and gel portions is generally obtained which can be worked up like a true solution.

Method II (One-shot Process)

An anhydrous mixture, heated to 60° to 130°C., of the high molecular weight and low molecular weight compounds containing hydroxyl groups mentioned in the table is intimately mixed with the given quantity of polyisocyanate. This causes the reaction temperature to rise to up to 200°C., depending on the reactivity of polyisocyanate, if desired under the action of a catalyst. If necessary, the product which is poured into a container, is subsequently heated at 100°C. until the isocyanate content is below 3 percent by weight, preferably below 0.3 percent by weight. The isocyanate content may if desired also be reduced during the subsequent operation of dissolving the product, by boiling under reflux in the presence of catalysts.

The mechanically disintegrated material is converted into a solution or a microgel as in Method I.

Description of a Commercial Pilot Plant for the Continuous Production of Starting Material (a) According to Method I The anhydrous polyester or polyether, containing hydroxyl groups, is stored in a heatable container and injected into an injection premixing chamber by means of a heatable Bosch pump. By means of another Bosch pump, the polyisocyanate is dosed through an injection nozzle into the injection premixing chamber where the said reactants are intimately mixed.

The prepolymer formed flows continuously through a coiled tube which is arranged adjacent to the mixing chamber and which can be heated by steam and cooled for controlling the temperature (capacity 5 to 10 liters, maximum steam temperature 185°C.) where it reacts in the absence of air.

The chain lengthening agent is conveyed by means of a gear wheel pump into a mixing head equipped with porcupine stirrer (delivery from below upwards) and combined with prepolymer.

The polyurethane flows from the mixing head either into an aluminum container with closable lid (volumetric capacity 25 to 30 kg) or preferably on to a conveyor belt.

Description of a Commercial Pilot Plant for the Production of Starting Material (a) by Method II The procedure is in principle the same as described above but the prepolymer reaction in the tube is dispensed with and instead the preheated reactants are combined directly in a mixing head.

Method III (Prepolymer-Solution process, Diamine Chain Lengthening)

When polyurethane which has been chain lengthened with diamine is used, high molecular weight polyurethane ureas are obtained in a short time if the chain lengthening reaction is carried out in solution at temperatures above 60°C. In such a reaction the diamine is preferably used in the form of a solution.

Method IV (Prepolymer-solution Process, Glycol Chain Lengthening)

The dehydrated mixed polyester containing terminal OH groups, specified in the following table, is reacted with the diisocyanate specified for 120 minutes at 100° to 120°C. To the viscous prepolymer cooled to 70° C. a chain lengthening agent, dissolved in the specified solvent and traces (5 to 30 ppm) of dibutyl tin are added. The reaction mixture is stirred at 60°C. until the viscosity of the solution ceases to rise, which takes up to 15 hours, and the solution is then diluted with the given quantity of solvent in two equal portions at intervals of 5 to 8 hours.

There is obtained a polyurethane solution which forms a subsidiary valence gel at room temperature, which gel is reversible by heat.

Column 8 Other additives
L Tris-(urethaneisocyanate) prepared from 1 mol of 1,1,1-trimethylpropane and 3 mols of 2,4-toluylene diisocyanate
N Biuret triisocyanate prepared from 3 mols of hexamethylene-1,6-diisocyanate and 1 mol of water

TABLE 1

| 1 | 2 | 3 | 4 | 5 | 6 | 7 | 8 |
|---|---|---|---|---|---|---|---|
| I | 73.34 I | 22.50 D 44 | 4.16 B | I | 15 THF | | |
| II | 72.80 I | 22.60 D 44 | 4.60 B | II | 10 MEK | | |
| III | 73.00 I | 22.65 D 44 | 4.35 B | I | 10 THF | | |
| IV | 70.85 I | 21.95 D 44 | 5.76 B | I | 10 THF | | 25 Pav+ 0 |
| V | 70.15 I | 24.75 D 44 | 5.10 B | II | 10 THF | | |
| VI | 70.15 I | 24.75 D 44 | 5.10 B | I | 10 MEK | | |
| VII | 71.65 I | 24.90 D 44 | 3.45 B | I | 20 THF | 1.13 | |
| VIII | 68.50 I | 26.22 D 44 | 5.28 B | I | 10 THF | 0.32 | |
| IX | 70.27 I | 24.42 D 44 | 4.83 B | I | 10 THF | 0.40 | 0.48 TMP/ |
| X | 69.91 I | 24.63 D 44 | 5.46 B | I | 10 THF | | |
| XI | 67.10 I | 26.90 D 44 | 6.00 B | I | 10 THF | | |
| XII | 67.00 I | 26.84 D 44 | 6.16 B | II | 10 THF | | |
| XIII | 55.36 I | 36.95 D 44 | 5.03 B | I | 15 THF | 1.00 | 2.66 TMP |
| XIV | 71.10 I | 25.10 D 44 | 3.80 EG | I | 20 THF | | |
| XV | 32.80 I | 39.60 D 44 | 27.60 TEG | II | 10 MEK | | 25.0 PVC |
| XVI | 52.80 I | 28.25 D 44 | 18.95 BM | III | 20 THF | | |
| XVII | 69.00 I | 19.20 T 65 | {8.62 BM+ 3.18 MPA} | III | 20 THF | | |
| XVIII | 81.40 I | 14.30 H | 4.30 DG | IV | 36.0 AC | | |
| XIX | 79.70 I | 16.00 H | 4.30 DG | IV | 43.6 AC | | |
| XX | 81.40 I | 14.30 H | 4.30 DG | IV | 37.0 AC | | 10.0 L/Z |
| XXI | {56.50 I 28.20 II} | 12.70 H | 2.60 B | II | 20.0 THF | | |
| XXII | {56.20 I 28.00 II} | 13.20 H | 2.60 B | II | 20.0 THF | | |
| XXIII | 78.08 I | 18.17 H | 3.75 B | I | 20.0 THF | 1.82 | |
| XXIV | 78.08 I | 18.17 H | 3.45 B | I | 20.0 THF | 2.10 | |
| XXV | 82.32 II | 12.17 H | 5.51 DG | I | 20.0 THF | | |
| XXVI | 67.95 III | 26.15 D 44 | 5.90 B | I | 10.0 THF | | |
| XXVII | 68.63 III | 25.40 D 44 | 5.97 B | I | 10.0 THF | | |
| XXVIII | 69.80 IV | 24.35 D 44 | 5.85 B | I | 20.0 THF | | |
| XXIX | 62.50 V | 29.69 D 44 | 7.81 B | I | 20.0 THF | | |
| XXX | 54.70 V | 35.56 D 44 | 9.74 B | I | 20.0 THF | | |
| XXXI | 53.20 V | 29.25 D 44 | 17.55 TEG | I | 20.0 THF | | |
| XXXII | 57.85 V | 29.47 D 44 | {3.91 B 8.77 TEG} | I | 20.0 THF | | |
| XXXIII | 54.50 V | 27.25 D 44 | 18.25 BM | III | 11.5 THF | | |
| XXXIV | 62.00 V | 27.00 T 65 | 11.00 B | I | 10.0 THF | | |
| XXXV | 69.54 VI | 24.15 D 44 | 6.31 B | I | 10.0 THF | | |
| XXXVI | 69.06 VI | 24.65 D 44 | 6.29 B | II | 10.0 THF | | |

Key to information given in Table I. Amounts indicated in parts by weight.

Column 1 Example number
Column 2 Higher molecular weight polyesters and polyethers containing hydroxyl end groups
  (a) (Co) polyester of adipic acid with the following glycol components:
    I Hexanediol: 2,2-Dimethylpropanediol-(1,3) in the ratio of 22 : 12; OH number 62, acid number 1,3
    II ethylene glycol; OH number 56, acid number 1
    III ethylene glycol; 1,4-butanediol in the ratio of 1 : 1; OH number 56, acid number 1
  (b) Polyether:
    IV Poly — (oxyethylene) glycol, OH number 52
    V Poly — (oxypropylene)glycol, OH number 56
    VI Poly — (oxybutylene) glycol, OH number 40
Column 3 Diisocyanates
  D 44 Diphenylmethane-4,4'-diisocyanate
  H Hexamethylene-1,6-diisocyanate
  T 65 2,4- and 2,6-toluylenediisocyanate isomeric mixture 65 : 35
Column 4 Chain lengthening agents
  B 1,4-butanediol
  DG Diethylene glycol
  EG Ethylene glycol
  TEG Tetraethylene glycol
  BM 4,4'-bis-(N-methylamino)-diphenylmethane
  MPA N-methyl-diaminopropane-(1,3)
Column 5 Methods of preparation of the polyisocyanate polyaddition product
  I Prepolymer process
  II One-shot process
  III Prepolymer-solution process (diamine chain lengthening)
  IV Prepolymer-solution process (glycol chain lengthening)
Column 6 Concentration (percent) and nature of solvent
  THF Tetrahydrofuran
  MEK Methylethyl ketone
  AC Acetone
Column 7 Free isocyanate content, based on solids content of the solution (Column 6)

Z Dibutyl tin(IV)-dilaurate; 0.1 percent based on solid polyurethane
PAV Graft copolymer of 41 percent by weight of vinyl chloride polymer and of a substrate, saponified to an extent 59 percent, of ethylene and of a copolymer originally containing 66 percent by weight of vinyl acetate, OH content 3.7 percent
PVC Polyvinyl chloride, K-value 70

Preparation of Emulsifying Polyurethanes (b) Capable of Salt Formation used as Starting Material for the Process According to the Invention (see Table 2, Column 3)

I. About 5.6 parts of N-methyldiethanolamine and about 65.8 parts of the product of the addition of 1 mol of methoxymethylisocyanate to 1 mol of diethanolamine are mixed with about 68.9 parts of hexamethylene diisocyanate at room temperature and heated to about 50°C. As soon as the reaction mixture has become viscous, about 100 parts by volume of acetone are added. Stirring is continued at about 60°C. until the viscosity no longer rises, and the mixture is then diluted with about 164 parts by volume of acetone. A 40 percent polyurethane solution is obtained.

II. About 750 parts of a copolyester of OH number 62 and acid number 1.3 prepared from adipic acid and a mixture of 1,6-hexanediol and 2,2-dimethyl-propane diol1(1,3) in the ratio of 22 : 12 are reacted for about 2 hours at about 110°C. with about 152.5 parts of hexamethylene diisocyanate. About 45 parts of N-methyldiethanolamine in about 600 parts by volume of acetone and about 2 drops of dibutyl tin dilaurate are added to the viscous mass at about 70°C. The solution is stirred for about 24 hours at about 60°C., about 900 parts by volume of acetone are added. The mixture is again stirred for about 12 hours at about 60°C. and then diluted with about 600 parts by volume of acetone. A 36 percent polyurethane solution is obtained.

III. About 750 parts of polyester used in II) are reacted with about 229.5 parts of hexamethylene diisocyanate for about 2 hours at about 110°C. A solution of about 45 parts of N-methyldiethanolamine and about 100 parts of the adduct of 1 mol of methoxymethylisocyanate and 1 mol of diethanolamine is added at about 70°C. The reaction mixture is stirred at about 60°C. until there is no further rise in viscosity, about 900 parts by volume of acetone are added, the mixture is again stirred until the viscosity remains constant and is then diluted with about 474 parts by volume of acetone. A 42 percent solution is obtained.

IV. The procedure is the same as in II) but with the use of about 147 parts of toluylene diisocyanate (isomeric mixture 65 : 35).

Process according to the invention:
(Preparation of polyurethane (urea) dispersions)
Method A The diluted quaternizing agent or acid is gradually added at about 50°C. to the isocyanate polyaddition product dissolved in the organic solvent (see Table) and the polyurethane capable of salt formation or quaternization and the mixture is stirred for 10 to 20 minutes. The required quantity of water, depending on the desired end concentration, is then added dropwise, either continuously or portion wise, and the organic solvent is distilled, if desired under reduced pressure, until part of the water has distilled off. The aqueous polyurethane (urea) dispersion specified in the table remains in the reaction vessel. The polyurethane dispersion may be filtered through a wire sieve (width of mesh 300 to 500 microns) to remove very coarse agglomerates.

Method B

Water and the acid are placed into a vessel equipped with stirrer, and a solvent mixture consisting of the isocyanate polyaddition product and the polyurethane capable of salt formation is added dropwise under the conditions indicated in the table and the procedure is then continued according to Method A.

Method C

Only water is placed into a vessel equipped with stirrer, and the mixture of the isocyanate polyaddition product and the ionic polyurethane (emulsifier) is added at 40° to 60°C. and the procedure is otherwise the same as in Method A.

Quaternization (e.g., with dimethyl sulphate) of the polyurethane capable of salt formation (preparation of emulsifier) is effected by stirring the reactants for 30 minutes at 20° – 60°C.

Method D

The polyurethane salt is prepared as described under B and dispersed or dissolved in water and the dispersion (30 percent) is gradually added dropwise into the polyurethane solution heated to about 50°C.

TABLE 2.—POLYURETHANE(UREA) DISPERSIONS

| 1 | 2 | 3 | 4 | 5 | 6 | 7 | 8 | 9 |
|---|---|---|---|---|---|---|---|---|
| 1 | 300 I | 42 II | 39 DMS+39 ES | A | 700 | 37 | Finely divided | 150 |
| 2 | 1,000 II | 12 III | 24 PS | A | 300 | 28 | Very finely divided | 76 |
| 3 | 300 III | 28 II | 13 DMS+1.5 ES | A | 150 | 23 | Finely divided | 95 |
| 4 | 300 IV | 4 III | 7 PS | A | 150 |  | Coarsely divided | 145 |
| 5 | 2,000 V | 24 III | 24 DMS+20 ES | A | 500 | 21 | ....do.... | 135 |
| 6 | 1,000 VI | 14 II | 13 DMS+13 ES | A | 200 | 33 | Finely divided | 132 |
| 7 | 1,000 VII | 25 III | 25 DMS+20 ES | A | 500 | 31 | ....do.... | 89 |
| 8 | 1,000 VIII | 25 III | 25 DMS+20 ES | A | 500 | 30 | Coarsely divided | 187 |
| 9 | 1,000 IX | 11 III | 22 PS | A | 270 | 30 | Coarse | 148 |
| 10 | 1,000 X | 12 III | 24 PS | A | 300 | 27 | Fine | 125 |
| 11 | 1,000 X | 15 III | 10 PS | A | 300 | 28 | Very coarsely divided | 115 |
| 12 | 1,000 X | 12 III | 24 PS | B | 300 | 28 | Fine | 132 |
| 13 | 1,000 X | 12 III | 5.3 HCl | A | 300 | 28 | Very coarsely divided | 123 |
| 14 | 1,000 X | 12 III | 14 MES | A | 300 | 27 | Finely divided | 148 |
| 15 | 500 I+500 X | 12 III | 24 PS | C | 300 | 27 | Fine | 125 |
| 16 | 2,000 XI | 28 II | 19 DMS+20 ES | A | 560 | 25 | Very coarsely divided | 185 |
| 17 | 2,000 XI | 28 II | 38 DMS+40 ES | .... | 560 | 26 | Coarsely divided | 193 |
| 18 | 2,000 XI | 28 II | 26 PS | A | 560 | 24 | Finely divided | 180 |
| 19 | 2,000 XI | 28 II | 15 MES | B | 560 | 24 | ....do.... | 175 |
| 20 | 2,000 XI | 28 IV | 25 DMS+24 ES | A | 400 | 30 | Very coarsely divided | 170 |
| 21 | 2,000 XI | 23 I | 10 DMS+15 PS | A | 400 | 30 | ....do.... | 175 |
| 22 | 2,000 XII | 24 III | 24 DMS+20 ES | C | 500 | 27 | Finely divided | 187 |
| 23 | 1,000 XII | 36 II | 20 DMS+20 ES | D | 250 | 26 | Coarsely divided | 190 |
| 24 | 1,000 XIII | 37 III | 28 DMS+30 ES | A | 420 | 25 | Finely divided | 195 |
| 25 | 800 XIV | 24 III | 24 DMS+24 ES | A | 500 | 35 | ....do.... | 130 |
| 26 | 400 XV | 5 III | 5 DMS+4 ES | A | 150 | 41 | Coarsely divided | 165 |
| 27 | 1,770 XVI | 42 III | 84 PS | A | 900 | 32 | Finely divided | 94 |
| 28 | 1,355 XVII | 32 III | 64 PS | A | 810 | 27 | Very finely divided | 58 |
| 29 | 1,500 XVIII | 35 II | 35 DMS+30 ES | A | 1,000 | 33 | Finely divided [1] | 80 |
| 30 | 2,040 XIX | 30 II | 30 DMS+30 ES | A | 1,500 | 35 | ....do.... | 85 |
| 31 | 1,500 XX | 20 II | 20 DMS+30 ES | A | 1,000 | 34 | Coarsely divided | 108 |
| 32 | 300 XXI | 42 II | 39 DMS+37 ES | A | 600 | 26 | Finely divided | 105 |
| 33 | 300 XXII | 36 III | 36 DMS+30 ES | A | 600 | 25 | ....do.... | 120 |
| 34 | 1,000 XXIII | 25 III | 25 DMS+20 ES | A | 500 | 25 | ....do [2].... | 115 |
| 35 | 1,000 XXIV | 25 III | 50 DMS+40 ES | A | 500 | 23 | ....do.... | 117 |
| 36 | 1,500 XXV | 36 III | 36 DMS+36 ES | A | 500 | 40 | ....do.... | 62 |
| 37 | 400 XXVI | 5 III | 5 DMS+4 ES | A | 150 | 26 | ....do.... | 108 |
| 38 | 400 XXVII | 5 III | 5 DMS+4 ES | A | 150 | 25 | ....do.... | 104 |
| 39 | 2,000 XXVIII | 25 III | 24 DMS+20 ES | A | 500 | 32 | ....do.... | 92 |
| 40 | 1,000 XXIX | 24 III | 24 DMS+20 ES | A | 500 | 30 | ....do.... | 175 |
| 41 | 1,000 XXX | 50 II | 38 DMS+40 ES | A | 280 | 46 | Very finely divided | 180 |
| 42 | 1,000 XXVIII | 24 III | 24 DMS+20 ES | A | 500 | 30 | ....do.... | 98 |
| 43 | 1,000 XXXII | 24 III | 24 DMS+20 ES | A | 500 | 30 | Finely divided | 105 |
| 44 | 1,583 XXXIII | 24 III | 45 PS | C | 570 | 27 | ....do.... | 135 |
| 45 | 500 XXIV | 13 II | 10 DMS+10 ES | A | 70 | 40 | ....do.... | 60 |
| 46 | 400 XXXV | 5 III | 5 DMS+4 ES | A | 150 | 25 | Coarsely divided | 115 |
| 47 | 400 XXXVI | 5 II | 10 PS | C | 150 | 22 | Finely divided | 110 |

[1] 1. The redispersible, aqueous dispersion prepared according to Example 29 is soluble in 10 times its quantity of tetrahydrofuran.
(a) A further 5 parts by volume of water and 0.5 part by volume of 2,4-toluylene diisocyanate are added to a 10 parts by volume sample.
(b) 0.5 part by volume of hexamethylol melamine ether are stirred into a 10 parts by volume sample and adjusted to pH 1.5 with phosphoric acid. By the end of 24 hours, the samples have become insoluble in tetrahydrofuran while their viscosity has increased.
[2] The freshly prepared dispersion still contains 1.24 percent of free NCO calculated on the amount of solid polyurethane which in the course of 22 hours at room temperature has undergone reaction with water except for 0.06 percent.

Key to Table 2
Quantities given in parts by weight

Column 1  Example number
Column 2  Solution of the nonionic, not quaternizable polyisocyanate polyaddition product, if desired with additives (Examples Table 1).
Column 3  Polyurethane capable of salt formation or of being quaternized, in solution in acetone; quantities refer to the solid material.
Column 4  Salt forming components
  DMS   Dimethylsulphate, 1 percent THF solution
  ES    Acetic acid, 1 percent aqueous solution
  PS    Phosphonic acid, 1 percent solution in water/THF in the ratio of 15 : 85
  HCl   Hydrochloric acid, 1 percent THF solution
  MES   Monochloroacetic acid, 1 percent THF solution
Column 5  Method of dispersion
Column 6  Quantity of water in part by volume
Column 7  Concentration (solids content) of the aqueous Polyurethane (urea) dispersion if desired sieved through a 500 micron mesh sieve.
Column 8  Particle size of the sedimenting but redispersible dispersion
Column 9  Sticking point (°C.) of the dried polyurethanes powder (Kofler bench)

Although the invention has been described in considerable detail for the purpose of illustration, it is to be understood that variations can be made by those skilled in the art without departing from the spirit of the invention and scope of the claims.

Example 48:
a. Polyurethane-emulsifier with stearyl-endgroups
A mixture consisting of

| | |
|---|---|
| 374 parts | by weight of a water-free polyester based on adipic acid, hexanediol-(1,6) and 2,2-dimethyl-propanediol-(1,3), mol-ratio 22:12, OH-number 62, acid number 1,3 and |
| 47,6 parts | by weight of N-methyldiethanolamine are reacted at 135 – 140°C by addition of |
| 92,4 parts | by weight of 1,6-hexamethylene diisocyanate in portions. After 30 minutes |
| 544 parts | by weight of tetrahydrofurane are added to the cooled melt under stirring. |

The prepolymer solution obtained by this way is reacted with 29,6 parts by weight of stearyl isocyanate at boiling temperature.

A high viscous 50 percent polyurethane solution is obtained which can be used as emulsifier after converting into salt-type form.

b. Polyurethane-dispersion
A sedimenting but redispersible aqueous dispersion is prepared according to method A, page 22, using

| | |
|---|---|
| 1500 parts | by weight of a polyurethane solution according to example V, table I, page 16, |
| 11 parts | by weight of a polyurethane emulsifier solution according to a) |
| 60 parts | by weight of 0,85% phosphorous acid dissolved in tetrahydrofurane and |
| 400 parts | by weight of water. The sticking point of the dispersion is 130°C. |

Example 49:

| | |
|---|---|
| 1500 parts | by weight of the polyurethane solution according to example XI, page 16, table I, |
| 7,5 parts | by weight of a polyurethane with tertiary nitrogen endgroups which was prepared in the melt by 120° from 1 mol 1,6-hexanediol-polycarbonate (OH-number 60), 2 mol 1,6-hexamethylene diisocyanate and 2 mol N,N-dimethylethanolamine (average molecular weight 2400), |
| 0,83 parts | by weight of dimethylsulfate dissolved in 50 ml tetrahydrofurane, |
| 40 parts | by weight of a 10 % acetic acid and |
| 400 parts | by weight of water are reacted according to method A, page 18. A polyurethane dispersion with a sticking point of 172°C is obtained. |

Example 50:

| | |
|---|---|
| 1500 parts | by weight of a polyurethane solution according to table I, page 16, example XI, |
| 15 parts | by weight of a polyurethane paste prepared from 0,6 mol of a polyester according to Example 48 a), 0,9 mol 1,6-hexamethylene diisocyanate and 0,6 mol N,N-diethylethanolamine (average molecular weight 4000), |
| 1 part | by weight of dimethylsulfate dissolved in 50 ml tetrahydrofurane, |
| 40 parts | by weight of a 10% acetic acid and |
| 400 parts | by weight of water are reacted according to method A, page 18. The polyurethane dispersion has a sticking point of 165°C. |

TABLE III

Content of $N^+$-groups in equivalent percent based on the sum of solid material a)+b) of the dispersion prepared according to examples 1 – 50.

| Example | $N^+$-content | Example | $N^+$-content |
|---|---|---|---|
| 1 | 0,011 | 26 | 0,0024 |
| 2 | 0,0021 | 27 | 0,0022 |
| 3 | 0,0021 | 28 | 0,0021 |
| 4 | 0,0021 | 29 | 0,0014 |
| 5 | 0,001 | 30 | 0,0008 |
| 6 | 0,0028 | 31 | 0,0011 |
| 7 | 0,0024 | 32 | 0,0091 |
| 8 | 0,0042 | 33 | 0,0082 |
| 9 | 0,0020 | 34 | 0,0024 |
| 10 | 0,0022 | 35 | 0,004 |
| 11 | 0,00087 | 36 | 0,0027 |
| 12 | 0,0022 | 37 | 0,0024 |
| 13 | 0,0013 | 38 | 0,0024 |
| 14 | 0,0013 | 39 | 0,0012 |
| 15 | 0,0018 | 40 | 0,0023 |
| 16 | 0,0021 | 41 | 0,0039 |
| 17 | 0,0042 | 42 | 0,0023 |
| 18 | 0,0012 | 43 | 0,0023 |
| 19 | 0,0007 | 44 | 0,0022 |
| 20 | 0,0026 | 45 | 0,0040 |
| 21 | 0,001 | 46 | 0,0024 |
| 22 | 0,0023 | 47 | 0,0022 |
| 23 | 0,0036 | 48 | 0,0026 |
| 24 | 0,0039 | 49 | 0,0040 |
| 25 | 0,0032 | 50 | 0,0045 |

What is claimed is:

1. An aqueous polyurethane dispersion consisting of a mixture of:
  a. from about 40 to about 99.5 percent by weight based on the weight of solid material of a polyisocyanate polyaddition product having a molecular weight above 5,000, selected from the group consisting of polyurethanes and polyureas said products being free from salt forming groups and prepared by reacting a compound having a molecular weight of from about 500 to about 20,000 and containing hydroxyl or amino groups with an organic polyisocyanate; and b. from about 0.5 to about 60 percent by weight based on the weight of solid material of a polyisocyanate polyaddition compound containing salt groups or groups capable of salt formation, said groups being selected from the group consisting of

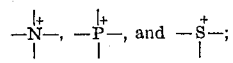

the mixture (a) plus (b) being dispersed in a quantity of water such that the solids content does not exceed 60 percent by weight, the quantity of salt groups in the dispersion being from about 0.0007 to about 0.011 equivalents per 100 grams of solid material (a) plus (b).

2. A process for preparing the dispersion of claim 1 comprising mixing reactants (a) and (b) in the proportions set forth, effecting formation of the salt of polymer (b) to an extent of from about 0.0007 to about 0.011 equivalents per 100 grams of solid material (a) plus (b) and dispersing the mixture in water such that the solids content is at most about 60 percent by weight.

* * * * *